US011660758B2

(12) United States Patent
Ha et al.

(10) Patent No.: US 11,660,758 B2
(45) Date of Patent: May 30, 2023

(54) ROBOTS FOR SERVING FOOD AND/OR DRINKS

(71) Applicant: Bear Robotics, Inc., Redwood City, CA (US)

(72) Inventors: John Jungwoo Ha, Redwood City, CA (US); Fangwei Li, Belmont, CA (US); Brennand Pierce, Redwood City, CA (US); Jungju Oh, Seoul (KR)

(73) Assignee: Bear Robotics, Inc., Redwood City, CA (US)

( * ) Notice: Subject to any disclaimer, the term of this patent is extended or adjusted under 35 U.S.C. 154(b) by 233 days.

(21) Appl. No.: 16/351,409

(22) Filed: Mar. 12, 2019

(65) Prior Publication Data

US 2020/0290208 A1 Sep. 17, 2020

(51) Int. Cl.
*B25J 11/00* (2006.01)
*B25J 9/16* (2006.01)
(Continued)

(52) U.S. Cl.
CPC ............ *B25J 11/008* (2013.01); *A47G 23/08* (2013.01); *B25J 9/1697* (2013.01);
(Continued)

(58) Field of Classification Search
CPC ........ B25J 11/008; B25J 9/1697; B25J 5/007; B25J 19/022; B25J 19/023; B25J 11/0045; B25J 19/04; B25J 9/0009; B25J 9/1664; B25J 9/1679; B25J 9/1666; B25J 9/1676; B25J 19/021; B25J 13/086; A47G 23/08; G05D 1/0248; G05D 1/0246; G05D 1/0274; G05D 1/0236; G05D 2201/0206; G06Q 50/12; G05B 2219/45084; G05B 2219/31005; G05B 2219/39091; G05B 2219/40371; G05B 2219/40455; G05B 2219/40479; G05B 2219/49143;
(Continued)

(56) References Cited

U.S. PATENT DOCUMENTS 9,037,396 B2    5/2015  Pack et al.
9,535,421 B1 *  1/2017  Canoso .............. G05D 1/0248
(Continued)

FOREIGN PATENT DOCUMENTS

JP    2013210339 A    10/2013
JP    2014194729 A    10/2014
(Continued)

OTHER PUBLICATIONS

I quit Google, started a restaurant, made a serving robot. (Jan. 3, 2018), 15 pages.

*Primary Examiner* — Ian Jen
*Assistant Examiner* — Esvinder Singh
(74) *Attorney, Agent, or Firm* — Dinsmore & Shohl LLP; Yongsok Choi, Esq.

(57) ABSTRACT

A robot includes: a base having a plurality of wheels; a body having a bottom portion coupled above the base, and a top portion above the bottom portion, the top portion configured to support food and/or drink; a first camera at the bottom portion, wherein the first camera is oriented to view upward; and a second camera at the top portion, wherein the second camera is configured to view upward.

26 Claims, 9 Drawing Sheets

(51) Int. Cl.
*A47G 23/08* (2006.01)
*G05D 1/02* (2020.01)
*G06Q 50/12* (2012.01)
*B25J 19/02* (2006.01)

(52) U.S. Cl.
CPC ......... *G05D 1/0246* (2013.01); *G05D 1/0248* (2013.01); *G05D 1/0274* (2013.01); *G06Q 50/12* (2013.01); *B25J 19/022* (2013.01); *B25J 19/023* (2013.01)

(58) Field of Classification Search
CPC ........ G05B 2219/49157; B60W 30/08; B60W 30/09; B60W 60/0011; A47L 11/4061; A47L 9/009; A47L 2201/04
See application file for complete search history.

(56) References Cited

U.S. PATENT DOCUMENTS

| | | | | |
|---|---|---|---|---|
| 9,902,069 | B2 * | 2/2018 | Farlow | G05D 1/0246 |
| 10,134,205 | B2 * | 11/2018 | Arena | G07C 9/00896 |
| 11,024,039 | B2 * | 6/2021 | Danielsson | G06K 9/6288 |
| 2017/0011580 | A1 * | 1/2017 | Huang | G06Q 30/0601 |
| 2017/0358201 | A1 * | 12/2017 | Govers | G08B 29/188 |
| 2018/0018805 | A1 * | 1/2018 | Kutliroff | G06T 7/90 |
| 2018/0150078 | A1 * | 5/2018 | Sugishita | G05D 1/0214 |
| 2018/0352612 | A1 * | 12/2018 | Hofleitner | F25D 13/04 |
| 2019/0270204 | A1 * | 9/2019 | Kawamura | B25J 11/008 |
| 2019/0327412 | A1 * | 10/2019 | Chiang | G06T 7/187 |
| 2020/0061843 | A1 * | 2/2020 | Wang | B25J 9/163 |
| 2020/0262084 | A1 * | 8/2020 | Ko | A47G 23/06 |
| 2020/0306984 | A1 * | 10/2020 | Eun | B25J 19/021 |
| 2020/0339350 | A1 * | 10/2020 | Dooley | B65G 1/0435 |
| 2020/0361078 | A1 * | 11/2020 | Kato | B25J 9/161 |

FOREIGN PATENT DOCUMENTS

| | | |
|---|---|---|
| JP | 2015084129 A | 4/2015 |
| JP | 2017515176 A | 6/2017 |
| JP | 2018041244 A | 3/2018 |
| KR | 101083700 B1 | 11/2011 |
| KR | 20160100149 A | 8/2016 |
| KR | 20170097017 A | 8/2017 |
| KR | 101878827 B1 | 7/2018 |

* cited by examiner

ROBOTS FOR SERVING FOOD AND/OR DRINKS

FIELD

This application relates generally to robots, and more specifically, to robots configured to serve food and/or drinks.

BACKGROUND

Many restaurants do not use robots for servicing customers. One reason is that environments of restaurants pose unique problems that may render use of robots difficult and/or unsatisfactory. For example, a restaurant may have various obstacles and spatial constraints, which make navigation of robot difficult. Also, restaurants may have various objects with different dimensions and heights, such as tables, bar stools, chairs, shelves, wine tables, etc., which makes it difficult for the robot to avoid collision.

SUMMARY

A robot includes: a base having a plurality of wheels; a body having a bottom portion coupled above the base, and a top portion above the bottom portion, the top portion configured to support food and/or drink; a first camera at the bottom portion, wherein the first camera is oriented to view upward; and a second camera at the top portion, wherein the second camera is configured to view upward.

Optionally, the first camera is oriented so that its field of detection covers a first area that is not covered by the second camera, and wherein the second camera is oriented so that its field of detection covers a second area that is not covered by the first camera.

Optionally, the robot further includes a third camera at the top portion, wherein the third camera is configured to view substantially horizontally.

Optionally, the robot further includes a processing unit configured to obtain a first point cloud from the first camera, and a second point cloud from the second camera, and process the first and second point clouds.

Optionally, the processing unit is configured to remove height components in the first and second point clouds, to obtain first and second two-dimensional point clouds, and wherein the processing unit is configured to combine the first and second two-dimensional point clouds to determine an obstacle boundary.

Optionally, the processing unit is configured to steer the robot based on the obstacle boundary.

Optionally, the robot further includes a processing unit configured to obtain a map of a facility, and determine a navigation route within the facility based on the map.

Optionally, the robot further includes a laser device configured to detect surrounding, e.g., at least behind the robot.

Optionally, the top portion comprises a support that is detachably coupled to a remaining part of the top portion, the support configured to support the food and/or the drink.

Optionally, the robot further includes a weight sensor coupled to the support.

Optionally, the robot further includes a processing unit configured to receive an input from a weight sensor or a camera, and process the input to determine whether an item has been placed on, or removed from, the support.

Optionally, the support meets requirements of National Sanitization Foundation (NSF), requirements of American National Standards Institute (ANSI), requirements of U.S. Food and Drug Administration (FDA), or any combination of the foregoing.

Optionally, the support is configured to withstand a temperature that is above 135° F.

Optionally, the support comprises Polyethylene Terephthalate (PET), Polyproylene (PP), Polycarbonate (PC), a synthetic fluoropolymer of tetrafluoroethylene, Polychlorotrifluoroethylene (PCTFE), Polyvinylidene fluoride (PVDF), a copolymer of ethylene and chlorotrifluoroethylene, or chlorinated polyvinyl chloride (CPVC).

Optionally, the robot further includes a processing unit configured to generate a first control signal to stop robot to service a first table in a facility, and generate a second control signal to move the robot towards a next destination in the facility based on a satisfaction of one or more criteria.

Optionally, the one or more criteria comprises a lapse of a predetermined period.

Optionally, the one or more criteria comprises a change in a weight supported by the robot.

Optionally, the processing unit is configured to determine whether the one or more criteria is satisfied based on an optical image, or based on a parameter determined based on the optical image.

Optionally, the next destination comprises a second table to be serviced, or a home position.

Optionally, the robot further includes an optical camera configured to view a spatial region above a food supporting surface associated with the top portion.

Optionally, the first camera comprises a first depth-sensing camera, and the second camera comprises a second depth sensing camera.

Optionally, the robot further includes a third depth-sensing camera.

Optionally, the bottom portion has a first cross sectional dimension, and the top portion has a second cross sectional dimension that is larger than the first cross sectional dimension.

Optionally, the robot further includes a speaker at the top portion or the bottom portion, and a processing unit configured to control the speaker to provide audio information.

Optionally, the robot further includes a microphone at the top portion or the bottom portion.

Optionally, the robot further includes one or more programmable buttons at the top portion.

Optionally, the bottom portion comprises a slot configured to accommodate a container, wherein the container is sized for holding tableware and/or food menus.

Optionally, the top portion has a frame that is moveable in a vertical direction from a first position to a second position.

Optionally, the robot further includes a touch-screen device that is detachably coupled to the top portion or the bottom portion.

Optionally, the robot further includes a first motor coupled to a first wheel of the plurality of wheels, and a second motor coupled to a second wheel of the plurality of wheels.

A robot includes: a base having a plurality of wheels; a body having a bottom portion coupled above the base, and a top portion above the bottom portion; and a support at the top portion, wherein the support is configured to withstand a temperature that is above 135° F.

Optionally, the support meets requirements of National Sanitization Foundation (NSF), requirements of American National Standards Institute (ANSI), requirements of U.S. Food and Drug Administration (FDA), or any combination of the foregoing.

Optionally, the support comprises Polyethylene Terephthalate (PET), Polyproylene (PP), Polycarbonate (PC), a synthetic fluoropolymer of tetrafluoroethylene, Polychlorotrifluoroethylene (PCTFE), Polyvinylidene fluoride (PVDF), a copolymer of ethylene and chlorotrifluoroethylene, or chlorinated polyvinyl chloride (CPVC).

Optionally, the support is configured to support food and/or drinks.

Optionally, the robot further includes one or more camera(s) located below the support.

A robot includes: a base having a plurality of wheels; a motor system mechanically coupled to one or more of the wheels; a body having a bottom portion coupled above the base, and a top portion above the bottom portion; a support at the top portion, wherein the support is configured to withstand a temperature that is above 135° F.; and a processing unit configured to operate the robot.

Optionally, the top portion comprises a support for supporting the food and/or the drink, and wherein the robot further comprises one or more weight sensor(s) coupled to the support; and wherein the processing unit is configured to provide a signal to operate the motor system based on an output from the one or more weight sensor(s).

Optionally, the robot further includes a microphone, wherein the processing unit is configured to provide a signal to operate the motor system in response to a voice command received by the microphone.

Optionally, the robot further includes a user interface, wherein the processing unit is configured to provide a signal to operate the motor system in response to an input received by the user interface.

Optionally, the user interface comprises a button and/or a touch screen.

Optionally, the robot further includes a wireless communication device, wherein the processing unit is configured to provide a signal to operate the motor system in response to an input received by the wireless communication device.

Optionally, the robot further includes a first camera configured to sense object(s) outside the robot.

Optionally, the robot further includes a second camera, wherein the first camera is oriented so that its field of detection covers a first area that is not covered by the second camera, and wherein the second camera is oriented so that its field of detection covers a second area that is not covered by the first camera.

Optionally, the robot further includes a third camera configured to view substantially horizontally.

Optionally, the processing unit is configured to obtain a first point cloud from the first camera, and a second point cloud from the second camera, and process the first and second point clouds.

Optionally, the processing unit is configured to remove height components in the first and second point clouds, to obtain first and second two-dimensional point clouds, and wherein the processing unit is configured to combine the first and second two-dimensional point clouds to determine an obstacle boundary.

Optionally, the processing unit is configured to steer the robot based on the obstacle boundary.

Optionally, the processing unit is configured to provide a first signal to operate the motor system to drive the robot to a first destination in a facility, and wherein the processing unit is also configured to determine whether a criterion for leaving the first destination is met, and to provide a second signal to operate the motor system to drive the robot away from the first destination if the criterion for leaving the first destination is met.

Optionally, the criterion comprises a maximum lapsed time since arrival at the first destination, and wherein the processing unit is configured to provide the second signal to operate the motor system if a lapsed time since arrival at the first destination reaches the maximum lapsed time.

Optionally, the processing unit is configured to obtain a map of a facility, and determine a navigation route within the facility based on the map.

Optionally, the robot further includes a laser device configured to detect surrounding.

Optionally, the robot further includes a weight sensor coupled to the support.

Optionally, the processing unit is configured to receive an input from a weight sensor or a camera, and process the input to determine whether an item has been placed on, or removed from, the support.

Optionally, the support meets requirements of National Sanitization Foundation (NSF), requirements of American National Standards Institute (ANSI), requirements of U.S. Food and Drug Administration (FDA), or any combination of the foregoing.

Optionally, the processing unit is configured to drive the robot to a first destination to service a first table in a facility.

Optionally, the bottom portion has a first cross sectional dimension, and the top portion has a second cross sectional dimension that is larger than the first cross sectional dimension.

Optionally, the robot further includes a speaker at the top portion or the bottom portion, wherein the processing unit is configured to control the speaker to provide audio information.

Optionally, the robot further includes a microphone at the top portion or the bottom portion.

Optionally, the robot further includes one or more programmable buttons at the top portion.

Optionally, the bottom portion comprises a slot configured to accommodate a container, wherein the container is sized for holding tableware and/or food menus.

Optionally, the top portion has a frame that is moveable in a vertical direction from a first position to a second position.

Optionally, the robot further includes a touch-screen device that is detachably coupled to the top portion or the bottom portion.

Optionally, the motor system comprises a first motor coupled to a first wheel of the plurality of wheels, and a second motor coupled to a second wheel of the plurality of wheels.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
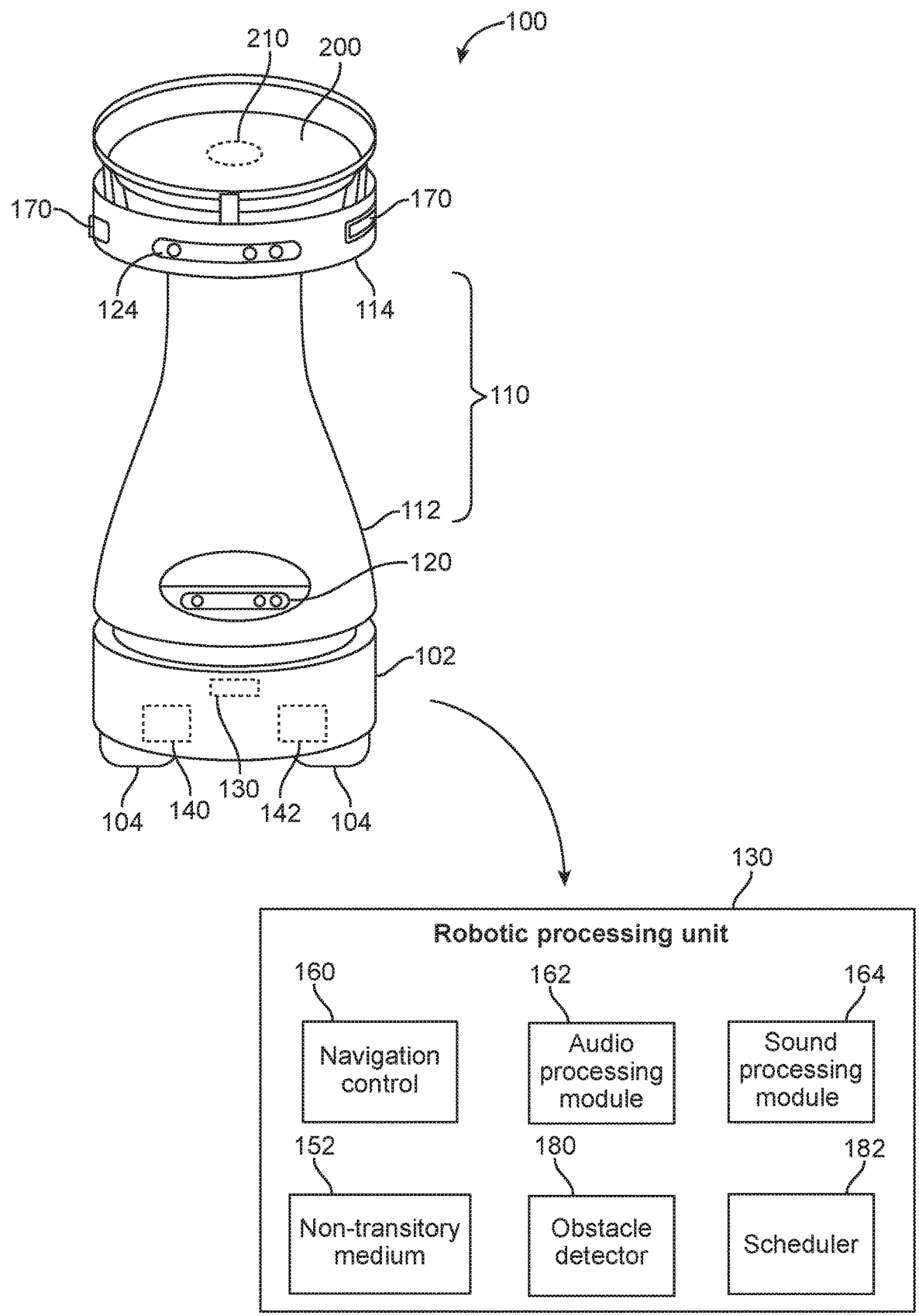
FIGS. 1-3 illustrate a robot in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Figure 2:
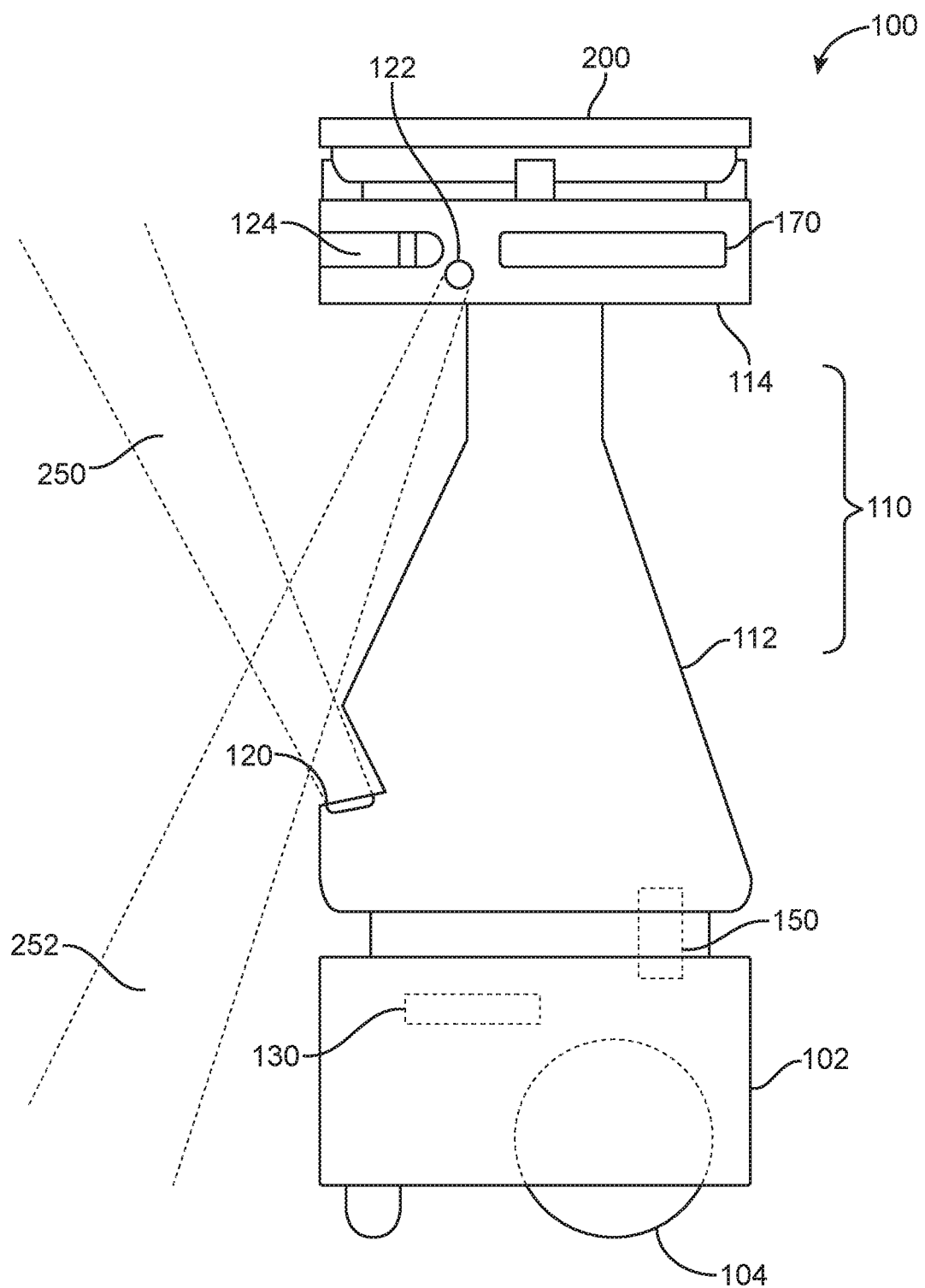
Figure 3:
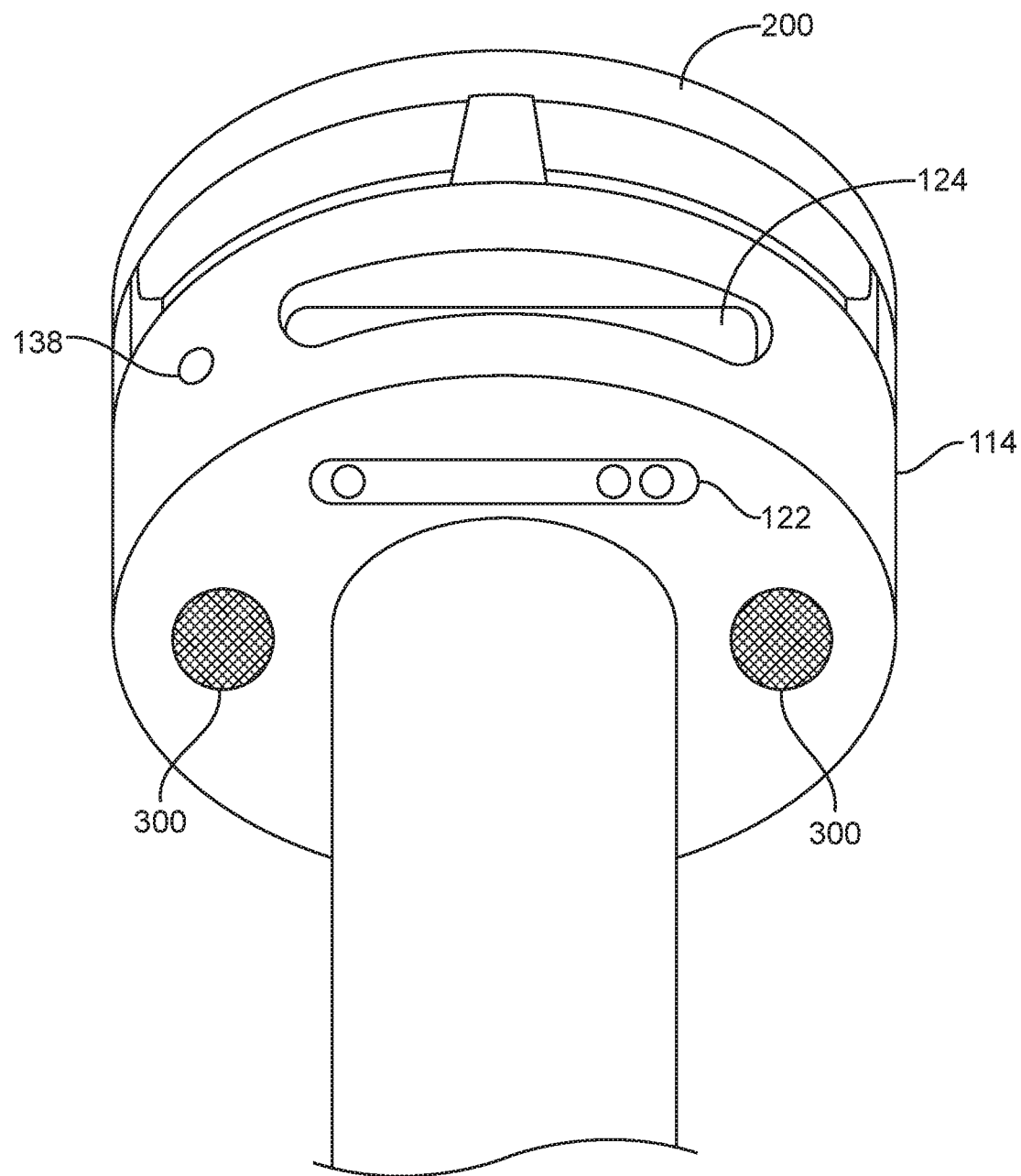

FIGS. 1-3 illustrate a robot 100 in accordance with some embodiments. The robot 100 includes a base 102 having a plurality of wheels 104. The robot 100 also includes a body 110 having a bottom portion 112 coupled above the base 102, and a top portion 114 above the bottom portion 112, wherein the top portion 114 is configured to support food and/or drink. The top portion 114 and the bottom portion 112 may be integrally formed together in some embodiments. In such cases, the top portion 114 and the bottom portion 112 refer to different parts of a component. Alternatively, the top portion 114 and the bottom portion 112 may be separate components that are mechanically coupled together. The robot 100 also includes a first camera 120 at the bottom portion 112, wherein the first camera 120 is oriented to view upward. The robot 100 further includes a second camera 122 at the top portion 114, wherein the second camera 122 is configured to view upward. The robot 100 also includes a third camera 124 at the top portion 114, wherein the third camera 124 is configured to view substantially horizontally. As used in this specification, the term "substantially horizontally" or a similar term refers to an orientation that is horizontal (0°)±30° or less, such as 0°±15°. In other embodiments, the robot 100 may not include the third camera 124, and the third camera 124 is optional.

In the illustrated embodiments, the bottom portion 112 has a first cross sectional dimension, and the top portion 114 has a second cross sectional dimension that is larger than the first cross sectional dimension. However, the robot 100 should not be limited to the configuration (e.g., shape) shown. In other embodiments, the robot 100 may have other configurations. Also, in the illustrated embodiments, the robot 100 has a maximum cross sectional dimension that is 36 inches or less, and more preferably 30 inches or less, or even more preferably 24 inches or less, such as 18 inches plus-or-minus 2 inches. This allows the robot 100 to navigate through crowd in a restaurant and/or through closely spaced furniture in a restaurant. In other embodiments, the robot 100 may have a maximum cross sectional dimension that is different from the examples provided. In the illustrated embodiments, the first and second portions 112, 114 are separate components that are assembled together. In other embodiments, the first and second portions 112, 114 may have an unity configuration. For example, they may be parts of a same housing in other embodiments.

In the illustrated embodiments, the first camera 120 comprises a first depth-sensing camera, and the second camera 122 comprises a second depth sensing camera. Also, the third camera 124 may comprise a third depth-sensing camera. In other embodiments, the first, second, and third cameras 120, 122, 124 may be other types of cameras.

As shown in FIG. 2, having the first camera 120 viewing upward is advantageous because its field of range of detection covers certain area (e.g., area 250) that cannot be covered by the second camera 122. Similarly, having the second camera 122 viewing downward is advantageous because its field of range of detection covers certain area (e.g., area 252) that cannot be covered by the first camera 120. Thus, the first camera 120 may detect an object in front of the top portion 114 of the robot that is higher up from the ground, and that is not detectable by the second camera 122. Similarly, the second camera 122 may detect an object in front of the bottom portion 112 and in front of the base 102, and that is not detectable by the first camera 120. Also, for certain depth sensing camera, it may have a zone (blind spot) such that the camera may not detect things too close from it—e.g., within a certain distance (e.g., up to 40 cm from the camera). Having the arrangement of cameras shown in FIG. 2 also addresses such problem. In some embodiments, the cameras 120, 122 may be oriented so that they collectively can detect obstacle that is within 5 meters from the robot 100. In other embodiments, the obstacle detection range may be more than 5 meters or less than 5 meters, from the robot 100. It should be noted that the term "upward" as used in this specification refers to a direction that is pointing above a horizontal plane and that is anywhere in a range defined by a vertical axis ±45°. Accordingly, a camera facing "upward" may refer to a camera-facing direction pointing above a horizontal plane and that is anywhere between 45° (measured from a vertical axis) and −45° (measured from the vertical axis). Similarly, the term "downward" as used in this specification refers to a direction that is pointing below a horizontal plane and that is anywhere in a range defined by a vertical axis ±45°. Accordingly, a camera facing "downward" may refer to a camera-facing direction pointing below a horizontal plane and that is anywhere between 45° (measured from a vertical axis) and −45° (measured from the vertical axis).

In addition, having the third camera 124 viewing forward may be advantageous because it detects objects that are further than the region covered by the first and second cameras 120, 122. In particular, while the first and second cameras 120, 122 together may provide a full coverage (i.e., no "blind spot") around the robot 100, their coverage may extend only a short distance from the robot 100. The third camera 124 may extend the coverage to regions that are further from the robot 100. In other embodiments, the first and second cameras 120, 122 may detect objects that are sufficiently far (e.g., 6 inches, 1 ft, 1 ft, 3 ft, 4 ft, 5 ft, 6 ft, 8 ft, 10 ft, 12 ft, etc.) from the robot 100. In such cases, the robot 100 may not need the third camera 124.

In some embodiments, the first and second cameras 120, 122 (and optionally the third camera 124) may be oriented so that they collectively cover all of the blind spots of all of the cameras. In some embodiments, the field of detection of the first camera 120 may cover the second camera 122, and the field of detection of the second camera 122 may cover the first camera 120. In other embodiments, the field of detection of the first camera 120 may not cover the second camera 122, and the field of detection of the second camera 122 may not cover the first camera 120.

In other embodiments, the robot 100 may include fewer than three cameras, or more than three cameras. For example, in other embodiments, the robot 100 may include only two cameras if the two cameras together can provide all of the detection coverage in front of the robot 100. This may be possible when one or both of the cameras have a wide angle of "view" or detection, such as an angle of detection that is 90° or more. In further embodiments, the robot 100 may include only a single camera if such camera has a wide angle of "view" or detection, such as an angle of detection that is 180°.

The robot 100 also includes a processing unit 130 configured to control various components of the robot 100. The processing unit 130 may be implemented using hardware, software, or a combination of both. In one implementation, the processing unit 130 may comprise a printed circuit board (PCB) with various components. In other embodiments, the processing unit 130 may be one or more integrated circuit(s) coupled together. Also, in some embodiments, the processing unit 130 may include one or more processors, such as general purpose processors, ASIC processors, FPGA processors, etc.

The robot 100 also includes a first motor 140 coupled to a first wheel of the plurality of wheels 104, and a second motor 142 coupled to a second wheel of the plurality of wheels 104. The motors 140, 142 may be activated together to rotate the wheels 104 in the same direction at the same rate to translate the robot 100 forward or backward. The motors 140, 142 may also be activated together to rotate only one of the two wheels 104, rotate the wheels in the same direction at different rates, or rotate the wheels 104 in different directions to thereby turn the robot 100. In other embodiments, the robot 100 may have a transport system that is different from that described. For example, in other embodiments, the robot 100 may have a single motor for controlling two wheels 104, and an independent steering mechanism for turning a third wheel. As another example, the robot 100 may have four wheels, such as four omni-directional wheels. In further embodiments, the robot 100 may include other types of wheels, such as tractor-type wheels.

In the illustrated embodiments, the robot 100 further includes a laser device 150 (shown in FIG. 2) configured to detect a surrounding, e.g., at least behind the robot. The laser device 150 may include a laser source configured to provide laser beam, and a motor configured rotate the laser beam. In one implementation, the laser device 150 may be a lidar device, which may have a detection range that is 10 m or more (e.g., 20 m). In some embodiments, the laser device 150 may be configured to provide data regarding a surrounding behind the robot, wherein the field of detection is at least 180°. In other embodiments, the field of detection may be more than 180° (e.g., 220° or more, 360°, etc.). In further embodiments, the field of detection may be less than 180°. Also, in other embodiments, the laser device 150 may be configured to detect a surrounding in front of the robot. In the illustrated embodiments, the laser device 150 is configured to provide input to the processing unit 130, which then processes such input to localize the robot 100 with respect to the surrounding. In some embodiments, a three dimensional map of the restaurant may be obtained and stored in a non-transitory medium 152 in the robot 100. The processing unit 130 may be configured to obtain signals from the laser device 150, and generate a real-time three-dimensional model of the surrounding. The processing unit 130 may then compare the three-dimensional model with the three dimensional map to identify the location of the robot 100.

Also, in the illustrated embodiments, the processing unit 130 of the robot 100 includes a navigation control 160 configured operate the motors 140, 142 of the robot 100 in order to navigate the robot 100 to different locations in a restaurant. The navigation control 160 is configured to obtain a map of the restaurant, a current position of the robot 100, and a target position of the robot 100, and operate the motors 140, 142 to move the robot 100 from the current position to the target position based on the map of the restaurant. Also, the processing unit 130 of the robot 100 may be configured to determine a navigation route within the restaurant based on the map. In some embodiments, the map of the restaurant may be transmitted wirelessly to the robot 100, and may be stored in the non-transitory medium 152 in the robot 100. For example, the map may be transmitted from a remote server, a cell phone, a tablet, etc. In other embodiments, the map of the restaurant may be stored in a USB drive, and may be transmitted from the USB drive to the robot 100 after the USB drive is plugged into a USB port at the robot 100.

In the illustrated embodiments, the robot 100 also includes a tray 200 for supporting various items, such as food, drinks, tableware, menus, to-go boxes, check, etc. The tray 200 that is detachably coupled to a part of the top portion 114. Such feature allows the tray 200 to be removed from the robot 100 for cleaning, serving customers, and/or replacement purpose. In some cases, the tray 200 may be considered to be a part of the top portion 114. The robot 100 also includes a weight sensor 210 for sensing a weight supported by the tray 200. The weight sensor 210 may be implemented using one or more strain gauges (e.g., 3 strain gauges, 4 strain gauges, etc.). As shown in the figure, the tray 200 has a planar supporting surface. In other embodiments, the tray 200 may have other configurations. For example, in other embodiments, the tray 200 may include glass holder(s) and/or bottle holder(s). Accordingly, as used in this specification, the term "tray" should not be limited to a supporting structure having a planar supporting surface, and may include any support structure or mechanical component designed to hold different items in a restaurant. In the illustrated embodiments, the weight sensor 210 is coupled to the processing unit 130, which allows the processing unit 130 to control the robot 100 based on input provided by the weight sensor 210. For example, in some embodiments, the processing unit 130 of the robot 100 may be configured to determine if an item has been placed on the tray 200. If so, the processing unit 130 may determine whether to move the robot 100 to a certain location based on the sensed weight. In one implementation, a restaurant server may place a food item on the tray 200 for delivery to a certain table. When the processing unit 130 determines that an item has been placed on a tray based on input from the weight sensor 210, the processing unit 130 may then operate the motors 140, 142 of the robot 100 to deliver the item to a certain table (e.g., a table input to the robot 100 by the server). Alternatively or additionally, the processing unit 130 of the robot 100 may determine if an item has been removed from the tray 200. If so, the processing unit 130 may determine whether to move the robot 100 to a certain location based on the weight change sensed by the weight sensor 210. In one implementation, the robot 100 may deliver a certain item (e.g., food) to a certain table. When the customer at the table has removed the item from the robot 100, the weight sensor 210 provides an input to the processing unit 130. The processing unit 130 determines that there is a reduction of the weight supported by the tray 200 of the robot 100, indicating that the customer has removed the item being delivered by the robot 100. The processing unit 130 may then operate the motors 140, 142 of the robot 100 to move the robot to a next destination.

In other embodiments, instead of, or in addition to, having the weight sensor 210, the robot 100 may also include an optical camera configured to view a spatial region above a food supporting surface associated with the top portion 114 (e.g., a spatial region above the tray 200). In such cases, the processing unit 130 may be configured to determine whether an item has been placed on the tray 200, or removed from the tray 200 based on an optical image obtained from the camera. For example, the camera may obtain an image of the spatial region above the tray 200 (while the tray 200 is not supporting any items) as a reference image. Such reference image may be stored in the non-transitory medium 152 in the robot 100. When an item has been placed on the tray 200, the camera captures an image, and transmits the image to the processing unit 130 for processing. The processing unit 130 may compare the image with the reference image stored in the non-transitory medium 152. In some embodiments, the comparing of the images by the processing unit 130 may be implemented by the processing unit 130 determining a correlation value between the two images. If the two images are different, the processing unit 130 may determine that an item has been placed on the tray 200.

Similarly, the camera may obtain an image of the spatial region above the tray 200 after an item has been placed on the tray 200. Such reference image may be stored in the non-transitory medium 152 in the robot 100. When the item has been removed from the tray 200, the camera captures an image, and transmits the image to the processing unit 130 for processing. The processing unit 130 may compare the image with the reference image stored in the non-transitory medium 152. In some embodiments, the comparing of the images by the processing unit 130 may be implemented by the processing unit 130 determining a correlation value between the two images. If the two images are different, the processing unit 130 may determine that an item has been removed from the tray 200.

In some embodiments, the capturing of the image by the camera may be performed in response to a change in the weight supported by the tray 200. For example, when an item has been placed on the tray 200, and/or when an item has been removed from the tray 200, the processing unit 130 will receive an input from the weight sensor 210 indicating the corresponding weight being sensed by the weight sensor 210. The processing unit 130 may then determine whether there is a weight change, and if so, the processing unit 130 may generate a signal to cause the camera to take an image. Alternatively, the camera may be configured to continuously generate images (e.g., a video) of the spatial region above the tray 200. In such cases, the generating of the images will not be based on any sensed weight. The processing unit 130 in such cases may be configured to analyze the images in real time, and determine whether an item has been placed on the tray 200, or removed from the tray 200.

It should be noted that the food and/or drink supporting mechanism is not limited to the tray 200 illustrated in the example. In other embodiments, the food and/or drink may be supported by any support, which may be any type of tray, or may have a configuration different from that of a tray. The support may be made from a sanitizable material, such as a material that would not produce any chemical and/or that would not exhibit a color change or color deterioration, when it contacts with a corrosive sanitizer (e.g., Chlorox). Alternatively or additionally, the material of the support may be dishwasher safe. For example, the support material may be robust enough to withstand heat (such as any temperature above 100° F. (e.g., from 100° F. to 200° F.), above 110° F. (e.g., from 110° F. to 140° F., above 135° F., etc.) and chemicals used in commercial dishwasher. Also, in some embodiments, the support material may be a food-contact safe material approved by Food & Drug Administration (FDA). In some embodiments, the support material may be an acid resistant plastic, such as a synthetic fluoropolymer of tetrafluoroethylene, Polychlorotrifluoroethylene (PCTFE), Polyvinylidene fluoride (PVDF), a copolymer of ethylene and chlorotrifluoroethylene, chlorinated polyvinyl chloride (CPVC), etc. Other examples of materials that may be used for the support include Polyethylene Terephthalate (PET), Polyproylene (PP), Polycarbonate (PC), glassteel, fiberglass, plastic, polycarbonate, etc. Furthermore, in some embodiments, the support may be constructed to meet requirements of National Sanitization Foundation (NSF), requirements of American National Standards Institute (ANSI), such as NSF/ANSI 2, 4, 36, 59, requirements of U.S. Food and Drug Administration (FDA), or any combination of the foregoing. In other embodiments, the support may be constructed to meet requirements of another agency or government body outside the U.S. (such as in Korea, China, Europe, Japan, etc.).

As shown in FIG. 3, the robot 100 further includes speakers 300 at the top portion 114. Alternatively, the speakers 300 may be at the bottom portion 112. The processing unit 130 may include an audio processing module 162 configured to control the speakers 300 to provide audio information. For example, in some embodiments, the processing unit 130 may operate the speakers 300 to inform a customer that food has arrived, and may instruct the customer to take a certain food item being supported on the robot 100. As another example, the processing unit 130 may operate the speakers 300 to inform a customer that a check has arrived. In other embodiments, the robot 100 may include only a single speaker 300, or more than two speakers 300.

In the illustrated embodiments, the robot 100 further includes a microphone 138 at the top portion 114. The microphone 138 is configured to receive sound, and provide microphone output signal for processing by the processing unit 130. In some embodiments, the processing unit 130 may include a sound processing module 164 configured to process the microphone output signal to identify a command and/or a request. For example, a customer or a user may instruct the robot 100 to go back to a "home" position by speaking "Go home" to the microphone 138. As another example, a customer may ask for menu, order food, order drink, request check, request server, request to-go box, etc., or any combination of the foregoing. The microphone 138 receives such audio request(s) and may provide corresponding microphone output signals for storage in the non-transitory medium 152, and/or for wireless transmission to a speaker (e.g., a speaker of a device worn by a server, a speaker in a kitchen, etc.). Alternatively, or additionally, the microphone output signals may be converted into a message for storage in a server or external device (e.g., a cell phone, a tablet, etc.), and a server may retrieve such message at any time desired by the server. In other embodiments, the microphone 138 may be implemented at the bottom portion 112 of the robot 100. Also, in other embodiments, the robot 100 may include more than one microphone 138. For example, in other embodiments, the robot 100 may include two microphones 138, which allow a direction of sound to be determined by the processing unit 130. In further embodiments, the robot 100 may include no microphone.

As shown in FIG. 1, the robot 100 further includes two programmable buttons 170 at the top portion 114. Each button 170 may be programmed to achieve a desired function. By means of non-limiting examples, each button 170 may be programmed to instruct the robot 100 to return to the "home" position, go to a dedicated position, provide a check, ask for a server, etc. In some cases, the robot 100 may include a user interface (e.g., a touch screen) for allowing a user of the robot 100 to program the buttons 170. The user interface may display a list of available functions for association with one or both of the buttons 170. Once the user selects a function for a certain button 170 using the user interface, the selection is then stored in the non-transitory medium 152 in the robot 100, and the button 170 will be assigned for the selected function. In other cases, a user may access an application in a cell phone or tablet, and use the application to program the button(s) 170. In such cases, the application may transmit the selected function for the button(s) 170 to a cloud for transmission to the robot 100, or directly to the robot 100 wirelessly. In further cases, the button(s) 170 may be programmed by an administrator or manufacturer of the robot 100. In such cases, the button(s) 170 are already pre-programmed before the robot 100 is delivered to a restaurant. In other embodiments, the robot 100 may include more than two programmable buttons 170, or no programmable button. Also, in other embodiments, the button(s) 170 may have a dedicated function that is predetermined, in which case, the button(s) 170 may not be programmable.

In the illustrated embodiments, the processing unit 130 of the robot 100 includes an obstacle detector 180 configured to obtain a first point cloud from the first camera 120, a second point cloud from the second camera 122, and the third point cloud from the third camera 124, and process the first, second, and third point clouds. In one implementation, the obstacle detector 180 of the processing unit 130 is configured to remove height components in the first, second, and third point clouds, to obtain first, second, and third two-dimensional point clouds. For example, if the first point cloud includes a point with coordinate (X=23, Y=55, Z=83), then the obstacle detector 180 of the robot 100 removes the height component (Z=83 in the example) to convert the 3D point to a 2D coordinate (X=23, Y=55). After the two-dimensional point clouds have been determined, the obstacle detector 180 then combines the first, second, and third two-dimensional point clouds to determine an obstacle boundary. The processing unit 130 may control the robot 100 based on the determined obstacle boundary. For example, the processing unit 130 may generate a control signal to stop the robot 100 and/or to steer the robot 100 to a different direction to thereby avoid a collision based on the determined obstacle boundary. In other embodiments, instead of using point clouds from all three cameras 120, 122, 124, the obstacle detector 180 may use only point clouds from the first and second cameras 120, 122 to determine the obstacle boundary.

Figure 4:
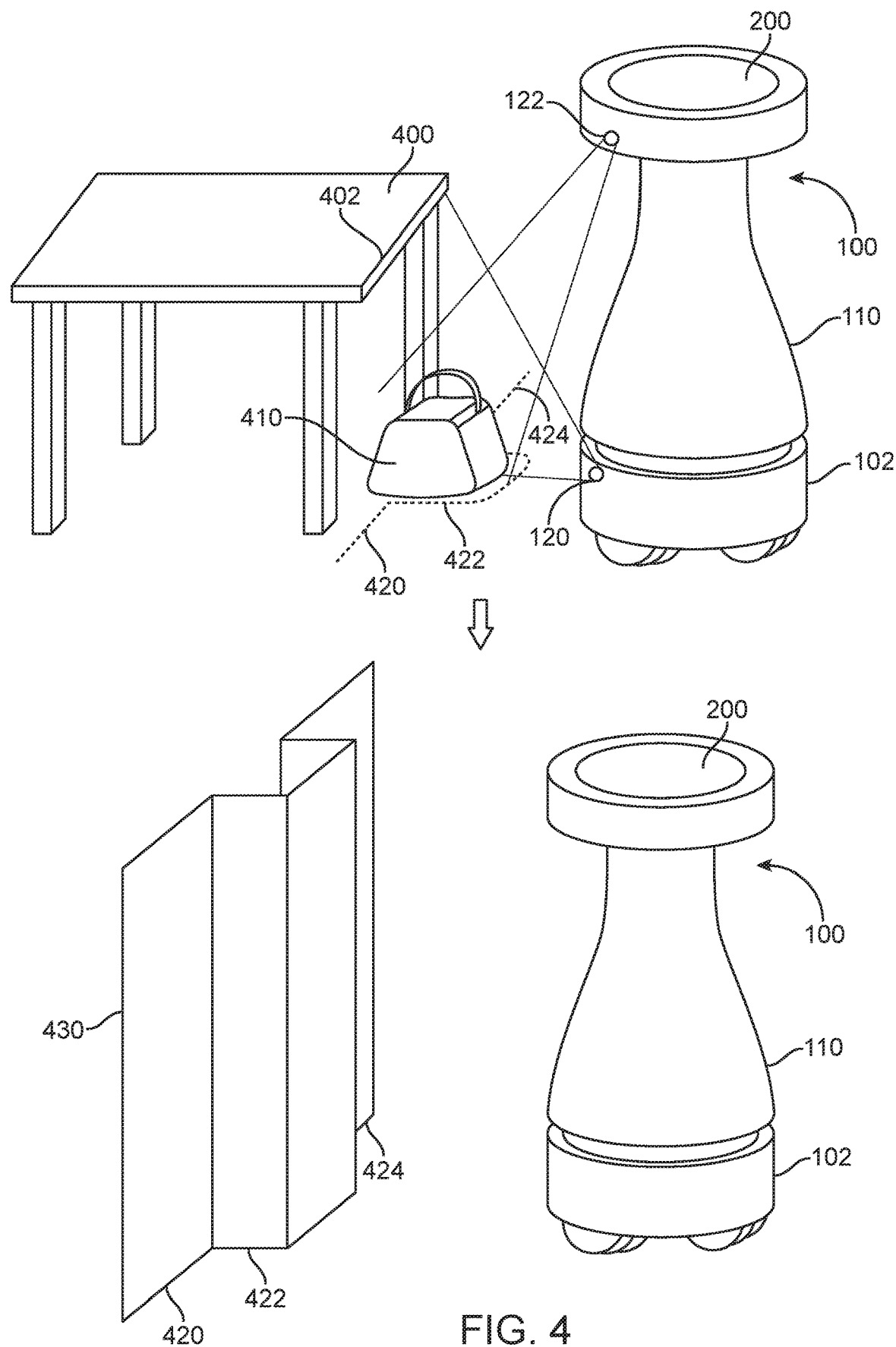
FIG. 4 illustrates an example of object detection technique using an unique camera system setup.

FIG. 4 illustrates an example of the above obstacle detection technique. As shown in the figure, there is a table 400 in a restaurant. The table 400 has a table edge 402. In the illustrated example, there is also a purse 410 on the floor partially below the table 400. As the robot 100 approaches the table 400, the first camera 120 facing upward detects the table edge 402, but it cannot detect the purse 410 on the floor. However, the second camera 122 facing downward can detect the purse 410 on the floor, but it cannot detect the table edge 402. The table edge 402 detected by the first camera 120 is captured as first point cloud that is transmitted by the first camera 120 to the processing unit 130. Similarly, the purse 410 detected by the second camera 122 is captured as second point cloud that is transmitted by the second camera 122 to the processing unit 130. Each point in the point cloud has a three-dimensional coordinate representing a position of a point relative to a camera coordinate system. The obstacle detector 180 in the processing unit 130 performs coordinate transformation for one or both of the first and second point clouds so that all the captured points (captured by both cameras 120, 122) can be combined with reference to the same coordinate system. The obstacle detector 180 also removes the height components in the first and second point clouds, to obtain first and second two-dimensional point clouds. Removing the height components in the point clouds has the effect of compressing all of the detected surfaces of the objects into a single plane. After the two-dimensional point clouds have been determined, the obstacle detector 180 then identify the boundary formed by the two-dimensional point clouds, and uses the boundary as the obstacle boundary. As shown in the figure, the determined obstacle boundary in the example includes a first boundary portion 420 that corresponds with a part of an outline of the table edge 402, a second boundary portion 422 that corresponds with a part of the outline of the purse 410, and a third boundary portion 424 that corresponds with a part of an outline of the table edge 402. The processing unit 130 may operate the robot 100 based on the determined obstacle boundary. In some embodiments, the processing unit 130 may operate the robot 100 to prevent the robot 100 from reaching the obstacle boundary, or to prevent the robot 100 from reaching a certain location that is a margin (e.g., 3 inches, 6 inches, 1 ft, etc.) away from the obstacle boundary. Forming an obstacle boundary based on objects at different height using the above technique has the effect of creating an artificial vertical boundary 430 that captures the boundary of the different objects at different heights. This technique of creating a collision avoidance boundary for the robot 100 is easy to implement and does not require significant computational resources.

In the above example, the obstacle boundary is described as being generated based on point clouds obtained using the first and second cameras 120, 122. In other embodiments, point cloud from the third camera 124 may also be used to determine the obstacle boundary. In such cases, the obstacle detector 180 of the processing unit 130 combine all of the point clouds from the first, second, and third cameras 120, 122, 124 to form the obstacle boundary.

Also, in the above example, the robot 100 has been described as being able to detect obstacles that are stationary. In other embodiments, the robot 100 may detect moving obstacles, such as persons, food carts, etc. in a restaurant. The cameras 120, 122 (and optionally also camera 124) may detect objects in real-time, and the processing unit 130 may process points cloud from these cameras to determine collision avoidance boundary in real-time. This allows the processing unit 130 to detect a moving object, e.g., a person, and to operate the robot 100 to stop or to go around the person.

Figure 5:
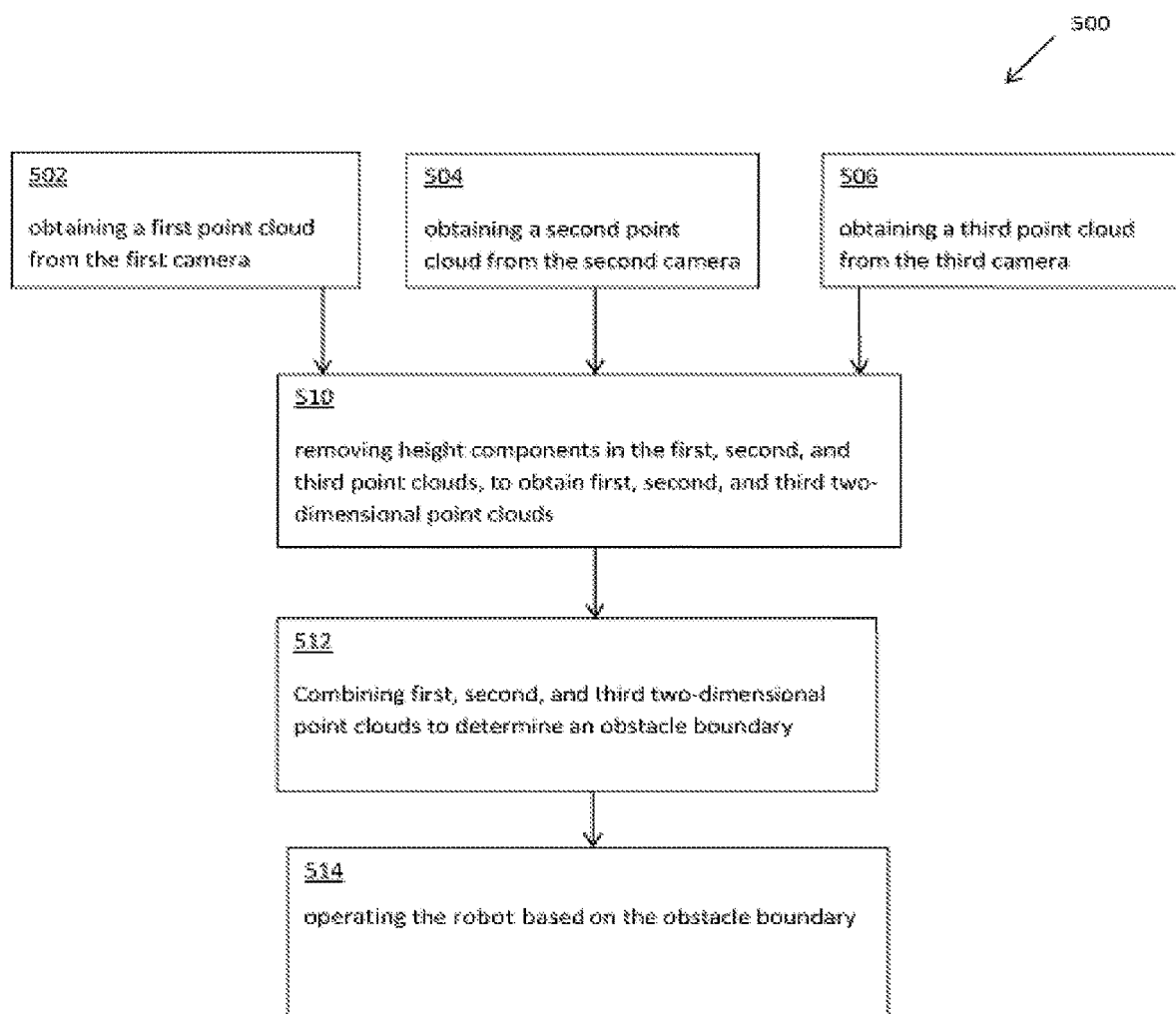
FIG. 5 illustrates a method of collision avoidance.

FIG. 5 illustrates a method 500 of collision avoidance. The method 500 may be performed by the robot 100. The method 500 includes obtaining a first point cloud from the first camera (item 502), obtaining a second point cloud from the second camera (item 504), and obtaining a third point cloud from the third camera (item 506). In some embodiments, items 502, 504, and 506 may be performed simultaneously. The method 500 also includes removing height components in the first, second, and third point clouds, to obtain first, second, and third two-dimensional point clouds (item 510). Next, the first, second, and third two-dimensional point clouds are combined to determine an obstacle boundary (item 512). Next, the robot 100 is operated based on the obstacle boundary (item 514). For example, the processing unit 130 may generate a control signal to stop the robot 100, and/or to steer the robot 100 to a different direction, based on the obstacle boundary. Although the method 500 has been described with reference to utilizing three cameras to obtain three point clouds for determining the obstacle boundary, in other embodiments, the third camera is optional and is not needed. In such cases, the method 500 may not include item 506, and the obstacle boundary in item 512 is determined based on the combination of the first and second two-dimensional point clouds.

In some embodiments, the processing unit 130 of the robot 100 may be configured to navigate the robot 100 to move to different locations in a restaurant based on input from a scheduler 182. The scheduler 182 may be implemented as a part of the processing unit 130. For example, the scheduler of the processing unit 130 may operate the robot 100 to go to a first table to provide a first service, and then return to a "home" position. As another example, the scheduler of the processing unit 130 may operate the robot 100 to go to a first table to provide a first service, and then to a second table to provide a second service, etc. In some embodiments, the scheduler of the processing unit 130 may be programmable via a user interface. For example, the robot 100 may include a user interface (e.g., a touchscreen) that allows a user of the robot 100 to program a schedule for the robot 100. In one implementation, the user interface may allow a user to select which table to go to, and the criterion for leaving the table. For example, a user may program the robot 100 to go to table No. 7 (e.g., for delivery of a food item), and the criterion for the robot 100 to leave that table may be programmed to be a reduction in a weight (e.g., a weight change regardless of the amount of change, or a weight change that is more than a certain prescribed threshold) sensed by a weight sensor under a food-supporting tray of the robot 100. In such cases, after the robot 100 has been programmed, the user may launch the robot 100 to go to table No. 7 to deliver a food item. After the robot 100 arrives at the table, the robot 100 then stops, and wait for the customer at table No. 7 to take the food item. Once the food item has been removed from the tray of the robot 100, the processing unit 130 receives an input from the weight sensor indicating that the item supported on the tray has been removed, the processing unit 130 then determines that the programmed criterion has been satisfied. Then the processing unit 130 operates the robot 100 to go to a next destination programmed in the robot 100. For example, if the next destination is "home", then the processing unit 130 will operate the robot 100 to go the "home" position. If the next destination is table No. 4 (to deliver a check), then the processing unit 130 will operate the robot 100 to go to table No. 4. Once the robot 100 has reached table No. 4, the robot 100 may print a check (e.g., using a printer installed in the robot 100). The robot 100 then waits for the customer at table No. 4 to take the check. When the printer (or the robot 100) senses that a check has been taken, the processing unit 130 then determines that the criterion for leaving table No. 4 has been satisfied, and may then operate the robot 100 to go the a next destination.

In the above example, the generation of a control signal to move the robot 100 (e.g., away from a table, to service a table, to return home, etc.) has been described with reference to a satisfaction of a weight criterion (e.g., a change in weight, or a change in weight that exceeds a certain amount). Alternatively or additionally, the criteria for operating the robot 100 to move the robot 100 may be based on other criteria or criterion. For example, in some cases, the operation of the robot 100 may be based on a lapse of a predetermined period (e.g., 30 seconds, 1 minute, etc.). In such cases, if the robot 100 has reached a table, it will stay there for the predetermined period. If nothing happens, the robot 100 will leave the table after the pre-determined has lapsed. In some cases, if a certain event (e.g., a removal of an item from the tray 200) occurs before the predetermined period has lapsed, the robot 100 may leave the table before the predetermined period has lapsed. Alternatively, in other cases, regardless of whether a certain event has occurred, the robot 100 may stay at the table until the predetermined period has lapsed.

As another example, the criteria for operating the robot 100 to move the robot 100 may be satisfied by an image or image parameter. For example, if the robot 100 includes a camera viewing the spatial region above the tray 200, the camera may provide images for indicating whether an item has been removed from the tray 200, and/or whether an item has been placed on the tray 200. The processing unit 130 may be configured to process such images and determine whether an event has occurred. For example, if the image(s) indicates that an item has been removed from the tray 200, the processing unit 130 may then operate the robot to move the robot to a next destination. In some cases, the processing unit 130 may process the image(s) to determine one or more image parameters, such as contrast, color, extracted feature, image correlation value, etc., and operate the robot 100 to move the robot 100 to a next destination based on a satisfaction of one or more criteria by the image parameter (s).

As a further example, the criteria for operating the robot 100 to move the robot 100 may be based on a command received by a customer or a server. For example, a customer at a table may press the button 170 or provide a voice command. In response, the robot 100 may then move to a next destination (e.g., "home" position, another table) in the restaurant. As another example, a server at the restaurant may also pressing the button 170, or providing a voice command. In response, the robot 100 may move to a next destination.

Figure 6:
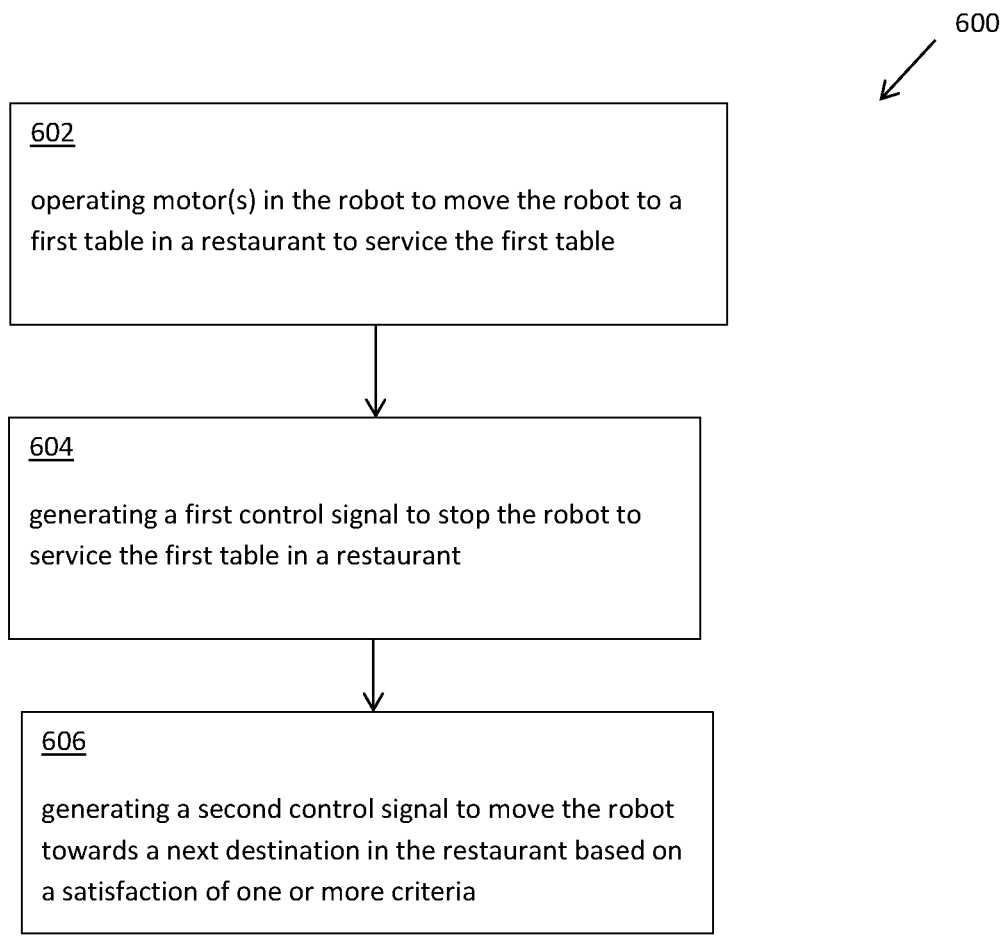
FIG. 6 illustrates a method performed by a robot.

FIG. 6 illustrates a method 600 performed by a robot. The method 600 includes operating motor(s) in the robot to move the robot to a first table in a restaurant to service the first table (item 602), generating a first control signal to stop the robot to service the first table in a restaurant (item 604), and generating a second control signal to move the robot towards a next destination in the restaurant based on a satisfaction of one or more criteria (item 606). In one implementation, for item 604, the first control signal to stop the robot may be generated by the processing unit 130 when the robot has reached a desired position associated with the first table. The desired position may be a designated area next to (e.g., within a certain distance, such as 6 inches, 1 ft, etc., from) the first table. Thus, the processing unit 130 may determine the actual positon of the robot, and determine whether the robot has reached the desired position. If not, the processing unit 130 continues to navigate the robot until it has reached the desired position. Also, by means of non-limiting examples for item 606, the one or more criteria may comprise a lapse of a predetermined period (e.g., robot will leave the table after a certain pre-determined period, e.g., 30 seconds, 1 minute, etc., has lapsed), a change in a weight supported by the robot, a criterion satisfied by an image or an image parameter, a command received by a customer or a server (e.g., the customer or server pressing button 170, or providing a voice command), or any combination of the foregoing. The next destination may be a second table to be serviced by the robot, a "home" position, etc.

Figure 7:
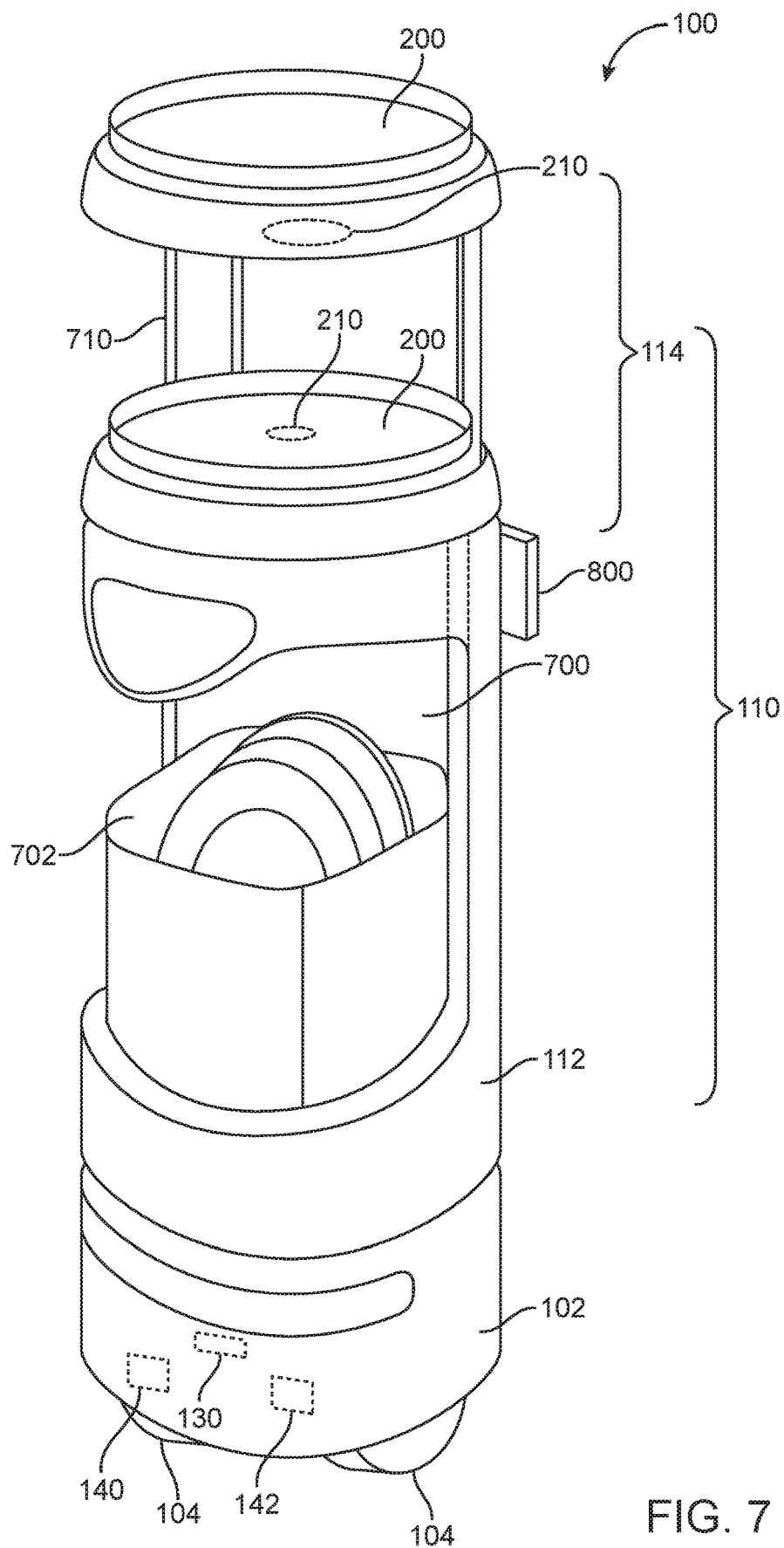
FIGS. 7-8 illustrate a robot in accordance with some embodiments.
Figure 8:
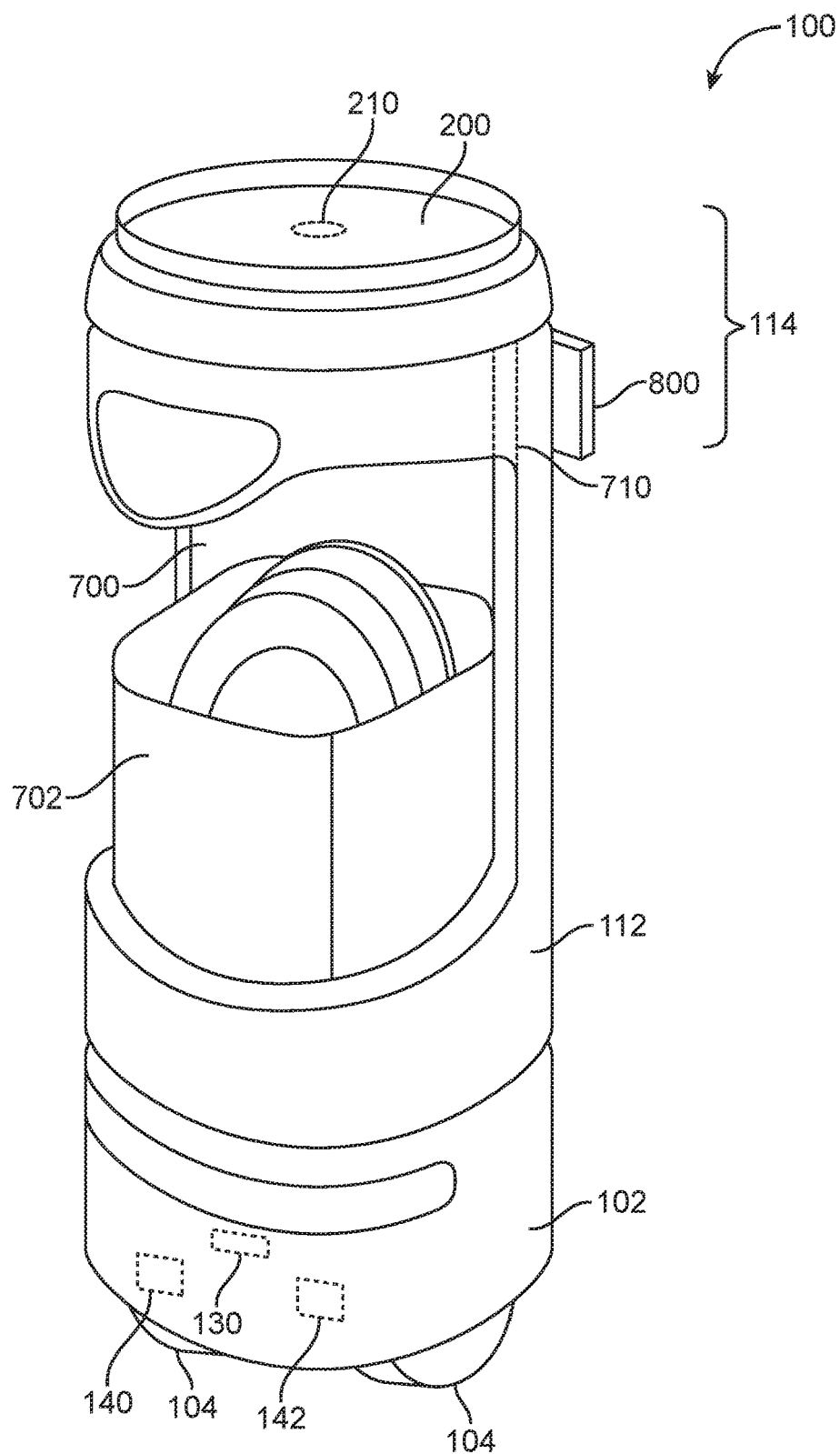

It should be noted that the robot 100 should not be limited to the configuration, shape, and features described, and that the robot 100 may have other configurations, shapes, and features in other embodiments. For example, as shown in FIGS. 7-8, in other embodiments, the robot 100 may have the configuration shown in the figure. In the illustrated embodiments, the bottom portion 112 of the robot 100 comprises a slot 700 configured to accommodate a container 702, wherein the container 702 is sized for holding tableware and/or food menus. Also, the top portion 114 of the robot 100 has a frame 710 that is moveable in a vertical direction from a first position to a second position. When the frame 710 is in the first position (like that shown in FIG. 8), the top portion 114 provides a single space for accommodating different items (e.g., for supporting food, drinks, tableware, menus, etc.). When the frame 710 is in the second position (like that shown in FIG. 7), the top portion 114 provides two layers of space for accommodating different items.

In the illustrated embodiments, the robot 100 further includes a touch-screen device 800 that is detachably coupled to the top portion 114. Alternatively, the touch-screen device 800 may be detachably coupled to the bottom portion 112 of the robot. In some embodiments, the touch-screen device 800 provides a user interface for allowing a user of the robot 100 to enter commands and/or to program the robot 100.

The robot 100 of FIGS. 7-8 may have any of the features described with reference to the robot 100 of FIGS. 1-3.

In some embodiments, the robot 100 may include a rechargeable battery for powering the various components of the robot 100. The battery may be charged using a cable, or a wireless charging pad.

In one or more embodiments of the robot 100 described herein, the robot 100 may optionally further include a credit card reader. For example, the credit card reader may be implemented at the top portion 114, and includes a slot for receiving a credit card. This allows the robot 100 to receive a credit card from a customer at a table, and process the credit card in the presence of the customer. The robot 100 may also optionally include a printer for printing a receipt for the customer.

Also, in some embodiments, instead of having just a single robot 100 servicing a restaurant, there may be multiple robots 100 servicing the same restaurant. In such cases, each robot 100 may include a wireless communication unit configured to communicate with other robot(s) 100 in the restaurant. In some embodiments, a service requested for a table may be communicated to all robots 100 in the restaurant (e.g., a server may transmit such request via a handheld device, such as a cell phone, a tablet, etc., or via a computer). The robots 100 may then collectively decide which one of the robots 100 to perform the service based on a pre-determined algorithm. For example, the pre-determined algorithm may select one of the robots to be the one closest to the table to be serviced, based on one of the robots with the least workload, etc. Once a service by the selected robot has been completed, the service request is then updated in all of the robots. Alternatively, in other embodiments, the robots 100 may not need to communicate with each other. Instead, all of the robots 100 may be configured to communicate with one or more servers wirelessly. For example, servers may carry handheld devices, e.g., cell phones, tablets, etc., and they can send requests wirelessly to different robots 100 in the restaurant.

It should be noted that the term "non-transitory medium", as used in this specification, may refer to one or more storage(s) or memory unit(s). If there are multiple storage(s) or memory unit(s), they may be parts of a single storage device or memory device, or alternatively, they may be separate storage devices or memory devices (which may or may not be coupled together).

Although the robot 100 has been described as being configured to serve food and/or drinks in a restaurant, in other embodiments, the robot 100 may be configured to serve food and/or drinks in other environments. By means of non-limiting examples, the robot 100 may be configured to serve food and/or drinks in nursing home, casino, hotel, airport, airplane, house, cafeteria, etc. Accordingly, the map described herein may be a map of a nursing home, a map of a casino, a map of a hotel, a map of an airport, a map of an airplane cabin, a map of a house, a map of a cafeteria, etc.

Processing Unit

Figure 9:
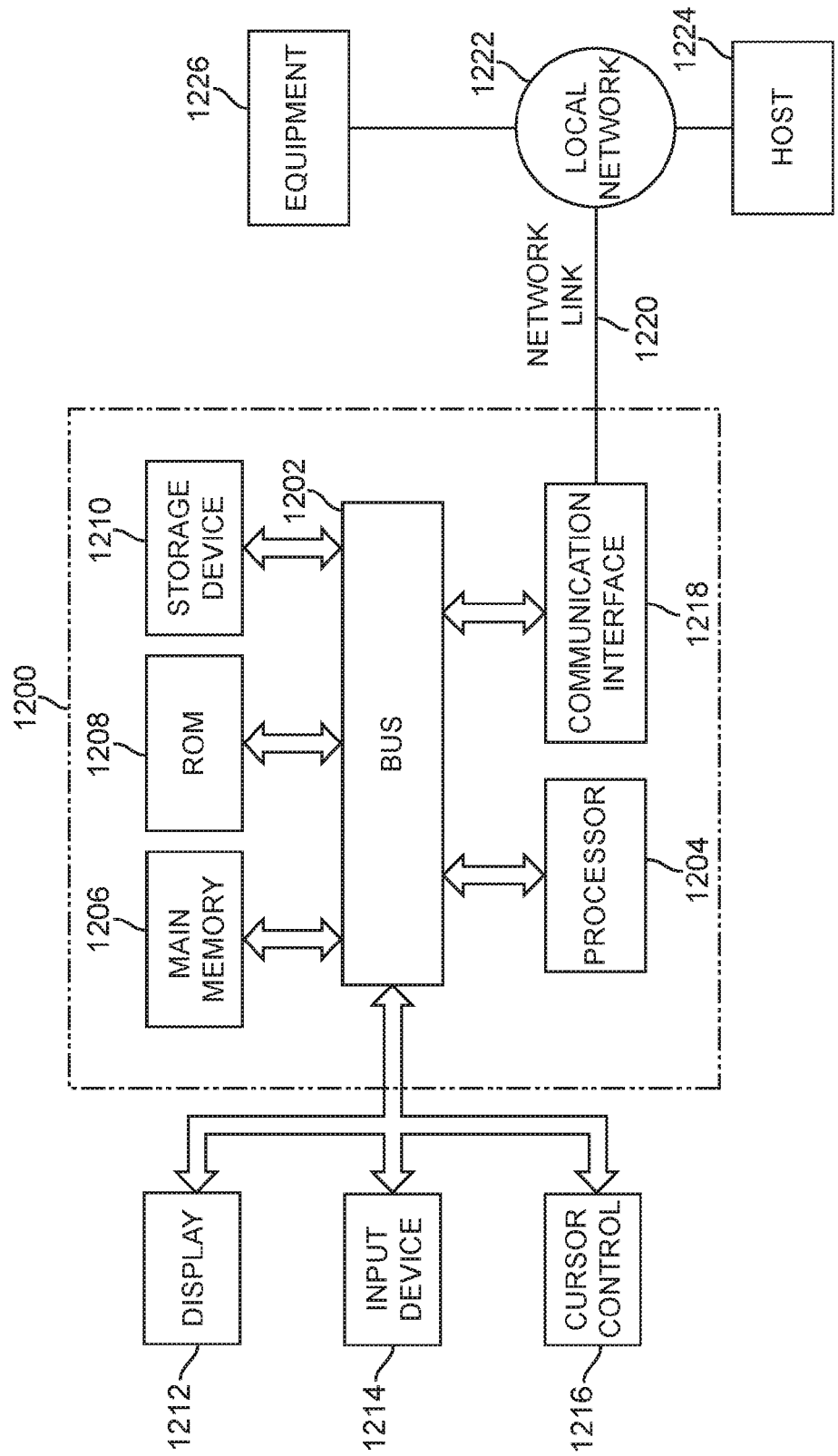
FIG. 9 illustrates a processing unit of a robot in accordance with some embodiments.

FIG. 9 is a block diagram that illustrates an embodiment of a processing unit 1200 of a robot. The processing unit 1200 may be the processing unit 130 in the robot 100 of FIG. 1 or FIG. 7. As shown in FIG. 9, the processing unit 1200 includes a bus 1202 or other communication mechanism for communicating information, and a processor 1204 coupled with the bus 1202 for processing information. The processing unit 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The processing unit 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The processing unit 1200 may be coupled via the bus 1202 to a display 1212, such as a flat panel, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The processing unit 1200 may be used for performing various functions (e.g., calculation) in accordance with the embodiments described herein. According to one embodiment, such use is provided by processing unit 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process acts described herein.

One or more processors in a multi-processing arrangement may also be employed to execute the sequences of instructions contained in the main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the processing unit 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The processing unit 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the processing unit 1200, are exemplary forms of carrier waves transporting the information. The processing unit 1200 can send messages and receive data, including program code, through the network (s), the network link 1220, and the communication interface 1218.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A robot comprising:
   a base having a plurality of wheels;
   a body having a bottom portion coupled above the base, and a top portion above the bottom portion, the top portion configured to support food and/or drink;
   a first camera at the bottom portion, wherein the first camera is oriented to view upward;
   a second camera at the top portion, wherein the second camera is configured to view downward; and
   a processing unit configured to obtain a first three-dimensional point cloud from a first object detected by the first camera and a second three-dimensional point cloud from a second object detected by the second camera and positioned at a different height from the first object, and to process the first and second three-dimensional point clouds,
   wherein the first camera is oriented so that its field of detection covers a first area that is not covered by the second camera, and the second camera is oriented so that its field of detection covers a second area that is not covered by the first camera,
   wherein the processing unit is configured to perform coordinate transformation for one or both of the first and second three-dimensional point clouds,
   wherein the processing unit is configured to remove height components from each of the points in the first three-dimensional point cloud to obtain a first two-dimensional point cloud and remove height components from each of the points in the second three-dimensional point cloud to obtain a second two-dimensional point cloud, and to combine the first and second two-dimensional point clouds to form a combined two-dimensional point cloud and generate a two-dimensional continuous obstacle boundary line based on the combined two-dimensional point cloud,
   wherein the first camera is configured to detect the first object in front of the top portion and the second camera is configured to detect the second object in front of the bottom portion and the base, and
   wherein the first and second objects are positioned above a floor on which the robot is positioned.

2. The robot of claim 1, further comprising a third camera at the top portion, wherein the third camera is configured to view substantially horizontally.

3. The robot of claim 1, wherein the processing unit is configured to steer the robot based on the two-dimensional continuous obstacle boundary line.

4. The robot of claim 1, wherein the processing unit is configured to obtain a map of a facility, and determine a navigation route within the facility based on the map.

5. The robot of claim 1, further comprising a laser device configured to detect a surrounding area.

6. The robot of claim 1, wherein the top portion comprises a support that is detachably coupled to a remaining part of the top portion, the support configured to support the food and/or the drink.

7. The robot of claim 6, further comprising a weight sensor coupled to the support.

8. The robot of claim 6, wherein the processing unit is configured to receive an input from a weight sensor or a camera, and process the input to determine whether an item has been placed on, or removed from, the support.

9. The robot of claim 6, wherein the support is configured to withstand a temperature that is above 135° F.

10. The robot of claim 1, wherein the processing unit is configured to generate a first control signal to stop the robot to service a first table in a facility, and generate a second control signal to move the robot towards a next destination in the facility based on a satisfaction of one or more criteria.

11. The robot of claim 10, wherein the one or more criteria comprises a lapse of a predetermined period.

12. The robot of claim 10, wherein the one or more criteria comprises a change in a weight supported by the robot.

13. The robot of claim 10, wherein the processing unit is configured to determine whether the one or more criteria is satisfied based on an optical image, or based on a parameter determined based on the optical image.

14. The robot of claim 10, wherein the next destination comprises a second table to be serviced, or a home position.

15. The robot of claim 1, further comprising an optical camera configured to view a spatial region above a food supporting surface associated with the top portion.

16. The robot of claim 1, wherein the first camera comprises a first depth-sensing camera, and the second camera comprises a second depth sensing camera.

17. The robot of claim 16, further comprising a third depth-sensing camera.

18. The robot of claim 1, wherein the bottom portion has a first cross sectional dimension, and the top portion has a second cross sectional dimension that is larger than the first cross sectional dimension.

19. The robot of claim 1, further comprising a speaker at the top portion or the bottom portion, wherein the processing unit is configured to control the speaker to provide audio information.

20. The robot of claim 1, further comprising a microphone at the top portion or the bottom portion.

21. The robot of claim 1, further comprising one or more programmable buttons at the top portion.

22. The robot of claim 1, wherein the bottom portion comprises a slot configured to accommodate a container, wherein the container is sized for holding tableware and/or food menus.

23. The robot of claim 1, wherein the top portion has a frame that is moveable in a vertical direction from a first position to a second position.

24. The robot of claim 1, further comprising a touch-screen device that is detachably coupled to the top portion or the bottom portion.

25. The robot of claim 1, further comprising a first motor coupled to a first wheel of the plurality of wheels, and a second motor coupled to a second wheel of the plurality of wheels.

26. The robot of claim 1, wherein:
the two-dimensional continuous obstacle boundary line includes a first line corresponding to a boundary of the first object and a second line corresponding to a boundary of the second object, and
the first line is continuously connected with the second line.

* * * * *